US009633565B2

(12) United States Patent
Conrad

(10) Patent No.: US 9,633,565 B2
(45) Date of Patent: Apr. 25, 2017

(54) ACTIVE SAFETY SYSTEM AND METHOD FOR OPERATING THE SAME

(71) Applicant: GM GLOBAL TECHNOLOGY OPERATIONS LLC, Detroit, MI (US)

(72) Inventor: Kevin P. Conrad, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/678,191

(22) Filed: Nov. 15, 2012

(65) Prior Publication Data
US 2014/0136044 A1 May 15, 2014

(51) Int. Cl.
*G08G 1/16* (2006.01)
*B60W 30/09* (2012.01)

(52) U.S. Cl.
CPC ............ *G08G 1/166* (2013.01); *B60W 30/09* (2013.01)

(58) Field of Classification Search
CPC ............................. B60W 30/09; G08G 1/166
USPC ........................... 701/23, 301, 302
See application file for complete search history.

(56) References Cited

U.S. PATENT DOCUMENTS

| 8,527,172 B2 | 9/2013 | Moshchuk |
| 2007/0276577 A1* | 11/2007 | Kuge et al. ............ 701/96 |
| 2012/0330541 A1* | 12/2012 | Sakugawa et al. ........ 701/301 |
| 2013/0282357 A1* | 10/2013 | Rubin et al. ............ 703/22 |

FOREIGN PATENT DOCUMENTS

| CN | 102452396 A | 5/2012 |
| KR | 20090078976 A | 7/2009 |

OTHER PUBLICATIONS

References as cited by the Examiner in a Chinese Office Action for Application No. 201310568852.6 dated Oct. 30, 2015.

* cited by examiner

*Primary Examiner* — Michael D Lang
(74) *Attorney, Agent, or Firm* — Reising Ethington, P.C.; Christopher Devries

(57) ABSTRACT

A method for use in an active safety system installed on a host vehicle is provided. The method comprises acquiring, for each of a plurality of target objects in the path of the host vehicle, a value of a parameter that is representative of a likelihood that the host vehicle will collide with the target object. In an exemplary embodiment, the parameter that is utilized comprises a time-to-collision between the host vehicle and the target object. The method further comprises evaluating one or more of the acquired parameter values to determine if the host vehicle is likely to collide with one or more of the target objects, and triggering one or more collision avoidance measures when it is determined that the host vehicle is likely to collide with one or more of the target objects. An active safety system configured to perform the methodology is also provided.

8 Claims, 4 Drawing Sheets

ACTIVE SAFETY SYSTEM AND METHOD FOR OPERATING THE SAME

FIELD

The present invention generally relates to vehicle systems and, more particularly, to active safety systems that account for multiple objects in the path of a vehicle for purposes of collision avoidance and/or mitigation.

BACKGROUND

Known active safety systems—or collision avoidance systems, as they may be called—for use with vehicles may include any number of features intended to help avoid, prevent, and/or mitigate collisions between a host vehicle (i.e., a vehicle equipped with the active safety system) and other objects (e.g., other vehicles referred to herein as "target vehicles") disposed in the path of the host vehicle. For example, when it is determined that a collision between the host vehicle and an object is imminent, one or more collision avoidance measures, such as, for example, providing alerts to the driver of the host vehicle and taking evasive action with respect to the vehicle itself (e.g., automatically applying the brakes of the host vehicle) may be taken or performed to prevent or at least mitigate the collision. While such active safety systems have proven useful, they are not without their drawbacks.

For example, in conventional systems, one or more collision avoidance measures may be taken with respect to a target object (e.g., target vehicle) in the path of the host vehicle that is closest to the host vehicle (e.g., a target vehicle that is directly ahead or in front of the host vehicle). While this may help to avoid a collision between the host vehicle and the closest target vehicle, in some instances, the closest target vehicle may not pose the greatest collision threat to the host vehicle. More particularly, in certain scenarios where multiple target vehicles are disposed in the path of the host vehicle, a hidden or unseen target vehicle several vehicles ahead may pose the greatest collision threat to the host vehicle. For example, assume that there are two target vehicles in the path of the host vehicle—a first target vehicle that is the closest target vehicle to the host vehicle, and a second target vehicle that is ahead of both the host vehicle and the first target vehicle. If the second target vehicle has braked or stopped, and the first target vehicle is either traveling at the same (or greater) velocity as the host vehicle or is able to perform an evasive maneuver to avoid colliding with the second target vehicle, then the second target vehicle (not the closest target vehicle) poses the greatest collision threat to the host vehicle. It may, therefore, be desirable to take multiple target vehicles into account during the operation of certain active safety systems.

SUMMARY

According to one embodiment, there is provided a method for use with an active safety system installed on a host vehicle. The method comprises calculating, for each of a plurality of target objects in the path of the host vehicle, a time-to-collision (TTC) between the target object and the host vehicle. The method further comprises evaluating one or more of the calculated TTCs to determine if the host vehicle is likely to collide with one or more of the target objects corresponding to the evaluated one or more TTCs. The method still further comprises triggering one or more collision avoidance measures when it is determined that the host vehicle is likely to collide with one or more of the target objects.

According to another embodiment, there is provided a method for use with an active safety system installed on a host vehicle. The method comprises acquiring, for each of a plurality of target objects in the path of the host vehicle, a parameter value that is representative of a likelihood that the host vehicle will collide with the target object. The method further comprises evaluating one or more of the acquired parameter values to determine if the host vehicle is likely to collide with one or more of the target objects corresponding to the evaluated one or more parameter values. The method still further comprises triggering one or more collision avoidance measures when it is determined that the host vehicle is likely to collide with one or more of the target objects.

Accordingly, to another embodiment, there is provided an active safety system for use on a host vehicle. The system comprises a target sensor configured to generate readings relating to each of a plurality of target objects in the path of the host vehicle. The system further comprises a control module. The control module is configured to: receive the readings corresponding each of the plurality of target objects from the target sensor; calculate, for each of the plurality of target objects, a time-to-collision (TTC) between the host vehicle and the target object using the received readings corresponding thereto; evaluate one or more of the calculated TTCs to determine if the host vehicle is likely to collide with one or more of the target objects corresponding to the evaluated one or more calculated TTCs; and trigger one or more collision avoidance measures when the host vehicle is likely to collide with one or more of the target objects.

DRAWINGS

Preferred exemplary embodiments will hereinafter be described in conjunction with the appended drawings, wherein like designations denote like elements, and wherein.

DESCRIPTION

The method and system described herein may be used to prevent, avoid, and/or mitigate collisions between a host vehicle and one or more of a plurality of target objects disposed in the path of the host vehicle, one or more of which may not be visible to the driver of the host vehicle. More particularly, in an exemplary embodiment, the method and system described herein determines whether it is likely that the host vehicle will collide with one or more target objects in the path of the host vehicle, and if so, to take affirmative action, such as triggering one or more collision avoidance measures (e.g., providing alerts to the occupant(s)

of the host vehicle, autonomously applying the brakes of the host vehicle, etc.). Unlike other known active safety systems where only a collision threat posed by a single target object that is closest in distance to the host vehicle can be evaluated or taken into account, the present method allows for the consideration of collision threats posed by any number of target objects in the path of the host vehicle. As such, collision threats posed by one or more target objects that are not the closest target object to the host vehicle, but that nonetheless pose the greatest collision threat to the host vehicle, may be taken into account and acted on accordingly.

For purposes of this disclosure, the phrase "target objects" refers to those objects disposed within a common path of the host vehicle (i.e., all target objects are disposed in the same path), as opposed to objects that may each be disposed in a different path of the host vehicle. Further, for purposes of illustration, the description below will be primarily directed to an embodiment wherein the target objects comprise vehicles (i.e., "target vehicles"). It will be appreciated, however, that the present disclosure is not meant to be so limited, as any number of objects or obstacles may constitute a target object. For instance, a downed tree limb, debris in the road, or any other object in the host vehicle path could constitute a "target object." Accordingly, the use of the method and system described herein for avoiding collisions with target objects other than vehicles remains within the spirit and scope of the present disclosure.

Figure 1:
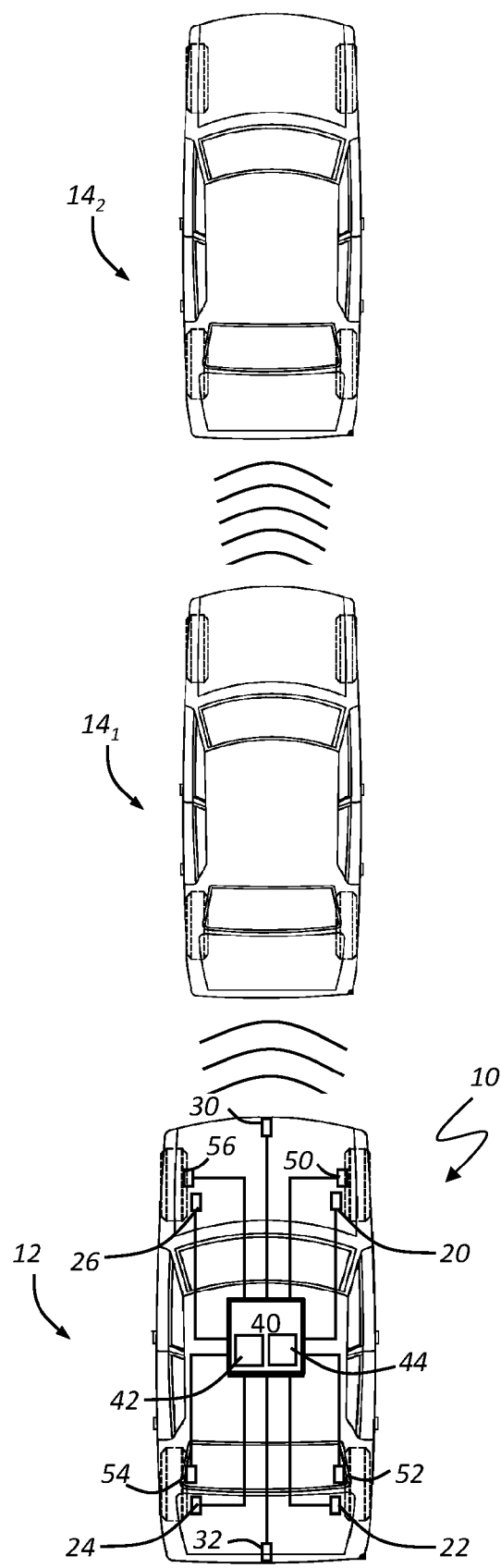
FIG. 1 is a schematic view illustrating a host vehicle having an exemplary active safety system installed thereon, and a plurality of target vehicles disposed in the path of the host vehicle.

With reference to FIG. 1, there is shown a general and schematic view of an exemplary active safety system 10 that is installed on a host vehicle 12 and may be used to avert or minimize a collision with one or more target vehicles 14 (i.e., target vehicles, $14_1$ and $14_2$) disposed in the path of the host vehicle 12. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments described herein and illustrated in FIGS. 1-3, and may be implemented in any number of different ways. According to one example, active safety system 10 includes vehicle sensors 20-26, target sensors 30-32, a control module 40, and one or more braking devices 50-56.

Any number of different sensors, devices, modules, and/or systems may provide active safety system 10 with information or input that can be used by the present method. These include, for example, the exemplary sensors shown in FIG. 1, as well as other sensors that are known in the art but are not shown here. It should be appreciated that vehicle sensors 20-26, target sensors 30-32, as well as any other sensor utilized by active safety system 10 may be embodied in hardware, software, firmware or some combination thereof. These sensors may directly sense or measure the conditions or characteristics for which they are provided, or they may indirectly evaluate such conditions or characteristics based on information provided by other sensors, devices, modules, systems, etc. Furthermore, these sensors may be electronically coupled to control module 40 in a number of ways well known in the art, such as, for example, through one or more wires or cables, a communications bus, a network, through a wireless connection, etc. These sensors may be integrated within another vehicle device, module, system, etc. (e.g., sensors integrated within an engine control module (ECM), traction control system (TCS), electronic stability control (ESC) system, antilock brake system (ABS), etc.), may be stand-alone components (as schematically shown in FIG. 1), or may be provided according to some other arrangement. It is possible for any of the various sensor readings described below to be provided by some other device, module, system, etc. in host vehicle 12 instead of being directly provided by an actual sensor element. In some instances, multiple sensors may be employed to sense a single parameter (e.g., for providing redundancy, security, etc.). It should be appreciated that the foregoing scenarios represent only some of the possibilities, as any type of suitable sensor arrangement may be used by active safety system 10, and therefore, system 10 is not limited to any particular sensor or sensor arrangement.

Vehicle sensors 20-26 may provide active safety system 10 with a variety of vehicle readings and/or other information that can be used by the present method. In one embodiment, vehicle sensors 20-26 generate vehicle readings that are representative of the position, velocity and/or acceleration of host vehicle 12. Some examples of such readings include a host vehicle velocity reading ($v_{HOST}$) and a host vehicle acceleration reading ($a_{HOST}$). Vehicle sensors 20-26 may utilize a variety of different sensors and sensing techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other vehicle readings may be derived or calculated from the output of these sensors, such as vehicle acceleration. In another embodiment, vehicle sensors 20-26 determine vehicle speed relative to the ground by directing radar, laser and/or other signals towards the ground and analyzing the reflected signals, or by employing feedback from a Global Positioning System (GPS). As mentioned above, vehicle sensors 20-26 may be part of some other device, module, system, etc., like an anti-lock braking system (ABS).

Target sensors 30-32 also provide active safety system 10 with a variety of readings and/or other information that can be used by the present method. In one example, target sensor 30 generates readings that are representative of the respective position, velocity, and/or acceleration of multiple target vehicles 14, including one or more of the target vehicles $14_2$ that may be obstructed or otherwise not visible to the driver of the host vehicle 12. These readings may be absolute in nature (e.g., a target vehicle velocity reading ($v_{TAR}$) or a target vehicle acceleration reading ($a_{TAR}$)) or they may be relative in nature (e.g., a relative velocity reading ($\Delta v$) which is the difference between target and host vehicle velocities, or a relative acceleration reading ($\Delta a$) which is the difference between target and host vehicle accelerations). According to one example, target sensor 30 provides active safety system 10 with the following inputs for each detected target vehicle 14 in the path of host vehicle 12: a relative velocity reading ($\Delta v$), a relative acceleration reading ($\Delta a$), and a relative distance reading ($\Delta d$) which is the distance between the corresponding target vehicle and the host vehicle. Target sensor 30 may be a single sensor or a combination of sensors, and may include, for example and without limitation, a light detection and ranging (LIDAR) device, a radio detection and ranging (RADAR) device, a vision device (e.g., camera, etc.), a vehicle-vehicle communications device, or a combination thereof.

According to a non-limiting exemplary embodiment, target sensor 30 includes a forward-looking long-range RADAR device, such as that commercially available from Continental AG under model number ARS 300. In such an embodiment, at least a portion of the target sensor 30 is mounted at the front of the host vehicle, such as at the front bumper or behind the vehicle grille, to allow the target sensor 30 to detect the presence of, and to generate readings relating to, multiple target vehicles 14 disposed in the forward-looking path of the host vehicle 12. In general terms, target sensor 30 comprises a transmitter, a receiver, and a processor (e.g., a field programmable gate array (FPGA) or other suitable processing device).

As is well known in the art, the transmitter is configured to emit electromagnetic signals in a direction that is forward or ahead of the host vehicle 12. The emitted signals may define a detection range or field of the sensor 30 extending from the transmitter to a point that is a certain distance ahead of host vehicle 12. In an exemplary embodiment, the detection range or field of sensor 30 extends from the transmitter to approximately 30-50 meters ahead of the host vehicle 12, however, it will be appreciated that this particular range is provided for exemplary purposes only and is not meant to be limiting in nature. For example, in other exemplary embodiments, the range may extend less than 30 meters or further than 50 meters ahead of the host vehicle, and such embodiments remain within the spirit and scope of the present disclosure. In any event, the transmitter may be mounted in a way that facilitates the generation of readings relating to each of a plurality of target vehicles 14 disposed within the same path of host vehicle 12, such as, for example and without limitation, those specifically identified above (e.g., a relative velocity reading ($\Delta v$), an relative acceleration reading ($\Delta a$), and a relative distance reading ($\Delta d$) for each target vehicle 14). More particularly, the transmitter may be mounted such that certain signals emitted therefrom travel to a first target vehicle that is closest to the host vehicle (e.g., target vehicle $14_1$ in FIG. 1), while other emitted signals travel to one or more other target vehicles (e.g., target vehicle $14_2$ in FIG. 1) that is/are located ahead of both the host vehicle and the closest target vehicle. In one embodiment, the transmitter is mounted and arranged in such a way that signals emitted therefrom may travel underneath one target vehicle to reach one or more other target vehicles. Accordingly, with reference to FIG. 1, signals emitted by the transmitter of sensor 30 may travel under the closer target vehicle $14_1$ and reach the further target vehicle $14_2$.

As is also well known in the art, signals emitted by the transmitter of sensor 30 may be reflected off of objects in the transmission path of the signals, and those reflected signals or returns are received by the receiver of the sensor 30. The returns received by the receiver are then, in turn, provided as inputs to the processor of the sensor 30. Utilizing various known techniques, including known digital signal processing techniques, the processor is configured to resolve which returns correspond to which target vehicles, and to then generate a single data package for each target vehicle containing various readings, data, and/or information relating to the corresponding target vehicle (e.g., relative velocity, relative distance, etc.). As will be described in greater detail below, the information generated by the processor of sensor 30 for each target vehicle may then be provided to, for example, the control module 40 of system 10, where it may be used for any number of purposes including, without limitation, those described below with respect to the present method.

As with target sensor 30, target sensor 32 may be a single sensor or a combination of sensors, and may include, for example and without limitation, a light detection and ranging (LIDAR) device, a radio detection and ranging (RADAR) device, a vision device (e.g., camera, etc.), a vehicle-vehicle communications device, or a combination thereof. In an exemplary embodiment, target sensor 32 includes a rearward-looking RADAR or LIDAR device that is mounted on the rear of the vehicle, such as at the rear bumper or in the rear window.

In addition to the above, in various embodiments, a camera or other vision device could be used in conjunction with one or both of sensors 30, 32. Further, it is possible for active safety system 10 to only include a front or forward-looking target sensor 30 such that the system is only a front prevention system, as opposed to being both a front and rear prevention system. Accordingly, active safety system 10 is not limited to any particular type of sensor or sensor arrangement, specific technique for gathering or processing sensor readings, or particular method for providing sensor readings, as the embodiments described herein are simply meant to be exemplary.

Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor readings (e.g., vehicle and target readings from sensors 20-26 and 30-32), look up tables or other data structures, algorithms (e.g., those utilized in the method described below), various threshold values, etc. Memory device 42 may also store pertinent characteristics and background information pertaining to vehicle 12, such as information relating to stopping distances, deceleration limits, maximum braking capability, turning radius, temperature limits, moisture or precipitation limits, driving habits or other driver behavioral data, etc. Control module 40 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern and perform the processes and methods described herein. Control module 40 may be electronically connected to other vehicle devices, modules and systems via suitable vehicle communications and can interact with them when required. These are, of course, only some of the possible arrangements, functions and capabilities of control module 40, as other embodiments could also be used.

Depending on the particular embodiment, control module 40 may be a stand-alone vehicle electronic module (e.g., an object detection controller, a safety controller, etc.), it may be incorporated or included within another vehicle electronic module (e.g., an integrated controller within the unit that includes the target sensors, a park assist control module, electronic brake control module (EBCM), etc.), or it may be part of a larger network or system (e.g., an active safety system, a traction control system (TCS), electronic stability control (ESC) system, antilock brake system (ABS), driver assistance system, adaptive cruise control system, lane departure warning system, etc.), to name a few possibilities. Accordingly, control module 40 is not limited to any one particular embodiment or arrangement.

Braking devices 50-56 may be a part of any suitable vehicle brake system, including systems associated with disc brakes, drum brakes, electro-hydraulic braking, electro-mechanical braking, regenerative braking, brake-by-wire, etc. In an exemplary embodiment, braking devices 50-56 are disc brakes and each generally includes a rotor, a caliper, a piston, and brake pads (not shown) and may be part of an electro-hydraulic braking (EHB) system. As is appreciated by skilled artisans, a tire-wheel assembly (not shown) is attached to a hub with several lug nuts so that the tire, wheel, hub, and rotor can all co-rotate together. A brake caliper straddles the rotor and carries a brake piston so that a compressive and frictional brake force can be applied by brake pads to opposing sides of the rotor during a braking event. The frictional brake forces slow the rotation of the rotor and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. Again, it should be appreciated that the preceding description of braking devices 50-56 is only provided for purposes of illustration. The method described herein may be used with any number of different braking devices including those found in electro-mechanical braking systems (EMB) or other brake-by-wire systems. For instance, braking devices 50-56 could be substituted with other suitable components, such as electro-mechanical brakes having electric calipers (e-calipers), drum brakes, and hybrid vehicle brakes that use regenerative braking.

In one embodiment, control module 40 generates one or more brake commands that are used to control brake devices 50-56. For instance, control module 40 may generate brake commands that are provided to a hydraulic unit and used to control one or more actuator(s), such as boost, isolation and/or dump valves. These valves can control the fluid pressure in hydraulic lines which lead to the front and/or rear wheels. By controlling the fluid pressure in the hydraulic lines, control module 40 is able to control the brake force and ultimately the brake torque exerted by disc brake devices 50-56. Other examples and implementations of braking devices 50-56 are certainly possible.

Figure 2:
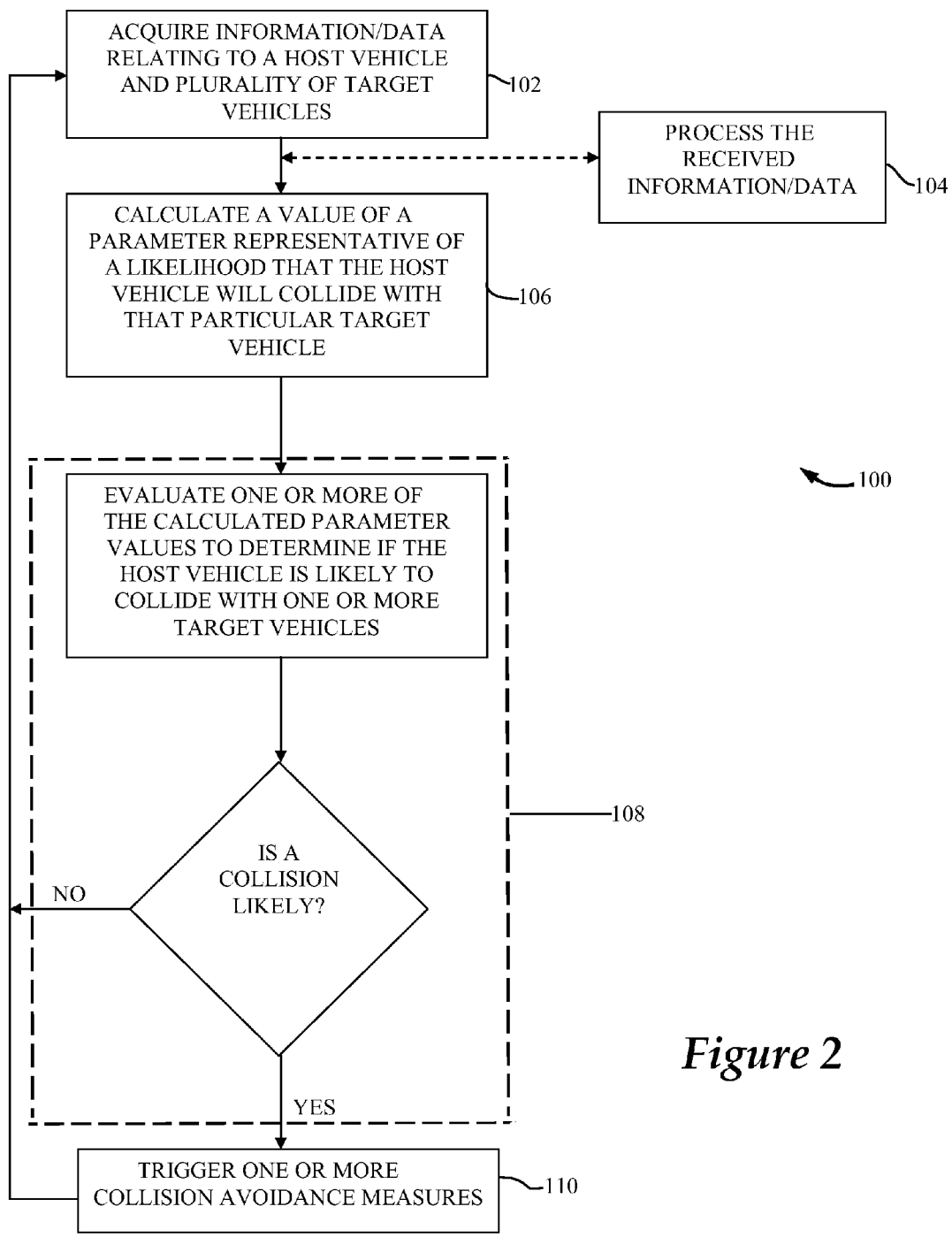
FIG. 2 is a flowchart illustrating an exemplary method for use with an active safety system, such as the exemplary system illustrated in FIG. 1.

Turning now to FIG. 2, there is shown an exemplary method 100 that may be implemented by active safety system 10 to detect an imminent collision between a host vehicle and one or more of a plurality of target objects, and to trigger one or more collision avoidance measures in order to avert or minimize the effects of such a collision. More particularly, according to an exemplary embodiment, the method comprises using readings from one or more vehicle and/or target sensors to determine whether it is likely that the host vehicle will collide with one or more target objects, and if so, to trigger one or more collision avoidance measures. This method, or at least portions thereof, may be performed automatically or autonomously without intervention by the driver of the host vehicle. As was discussed above, for purposes of illustration, the description of method 100 below will be primarily directed to an embodiment wherein the target objects comprise vehicles (i.e., "target vehicles"). It will be appreciated, however, that the present disclosure is not meant to be so limited, as any number of objects or obstacles, including those described above, may constitute a target object. Accordingly, the use of method 100 for avoiding collisions with target objects other than vehicles remains within the spirit and scope of the present disclosure.

In an exemplary embodiment, method 100 comprises a step 102 of acquiring information/data from one or more of both vehicle sensors 20-26 and target sensors 30-32 relating to host vehicle 12 and target vehicle(s) 14. This information or data may comprise values of certain parameters relating to the host vehicle 12 and/or target vehicle(s) 14, and may be acquired in a variety of ways. For example, control module 40 may receive electrical signals or readings from the vehicle sensors 20-26 and target sensors 30-32 that are representative of, or that correspond to, values of certain conditions/parameters, such as, a host vehicle velocity ($v_{HOST}$) (received from vehicle sensors 20-26, for example), a relative velocity ($\Delta v$) and relative distance ($\Delta d$) between the host vehicle and each target vehicle (received from sensor 30, for example), and/or an actual target vehicle velocity ($v_{TAR}$) for each target vehicle (also received from, for example, target sensor 30). In addition, or alternatively, electrical signals or readings received by control module 40 from one or more vehicle sensors 20-26 and target sensors 30-32 may be used to derive or calculate values of one or more parameters/conditions relating to the host and target vehicles, such as, for example, acceleration values of each target vehicle. It is also possible for the readings corresponding to the host and target vehicles to be provided by other components (e.g., controllers, devices, sensors, modules, etc.) that are part of, or configured for communication with, active safety system 10. These readings can shed light on the current conditions affecting the host and target vehicles, and they may be calculated or otherwise processed by control module 40. In an exemplary embodiment, method 100 is an iterative method that is repeated periodically (e.g., approximately every 40 ms or so), and so step 102 may be repeated for each iteration of method 100. Further, while the description above has been with respect to step 102 being performed by control module 40, it will be appreciated that in other exemplary embodiments, suitable components that are part of, or configured for communication with, system 10 other than control module 40 may be configured to perform step 102, and such embodiments remain within the spirit and scope of the present disclosure. Accordingly, it will be appreciated that the present disclosure is not meant to be limited to the performance of step 102 by any one or more particular components With respect to the information/data received from the target sensor 30, in an exemplary embodiment, target sensor 30 is configured to provide a single data package for each target vehicle to control module 40. Each data package contains, for example, the information/data corresponding to that respective target vehicle. In an exemplary embodiment, method 100 may optionally comprise a step 104 of processing the information/data received by the control module from the target sensor 30. For example, step 104 may comprise, for example, decompressing the received data and/or converting it into an appropriate or suitable format for use by the control module 40. In addition, or alternatively, step 104 may comprise coordinate transformation. For instance, in an exemplary embodiment target sensor 30 is configured to provide the data to control module 40 in polar coordinates relative to the position of the target sensor 30 (e.g., the transmitter thereof). In such an embodiment, and using techniques that are well known in the art, control module 40 is configured to transform the data from polar coordinates into Cartesian coordinates relative to a point on the host vehicle, such as, for example, the centerline of the bumper thereof. In another exemplary embodiment, step 104 may alternatively or additionally comprise performing one or more plausibility checks to determine if the received data is usable, and/or combining or fusing various other types of data, such as, for example, data received from other target sensors (e.g., cameras, short range RADAR, etc.) with the data received from target sensor 30. In an embodiment wherein method 100 includes step 104, once the data is converted, transformed, or otherwise processed, it may be used to, for example, derive additional information/data relating to the corresponding target vehicle, and/or to perform one or more of the steps of method 100 described below. As with step 102, while the description above has been with respect to step 104 being performed by control module 40, it will be appreciated that in other exemplary embodiments, suitable components that are part of, or configured for communication with, system 10 other than control module 40 may be configured to perform step 104, and such embodiments remain within the spirit and scope of the present disclosure. Accordingly, it will be appreciated that the present disclosure is not meant to be limited to the performance of step 104 by any one or more particular components.

Whether or not method 100 includes step 104, in an exemplary embodiment, method 100 further comprises a step 106 of calculating, for each of a plurality of target vehicles, a value of a parameter that is representative of a likelihood that the host vehicle will collide with that particular target vehicle. Stated differently, the calculated value is representative or indicative of the collision threat posed by the target vehicle to the host vehicle. In an exemplary embodiment, the parameter values are calculated control module 40 using the information/date acquired in step 102. Accordingly, for each target vehicle, the information/data corresponding thereto is/are used to calculate a respective parameter value.

The particular parameter for which values are calculated in step 106 may comprise any number of parameters. For purposes of illustration, the description below will be primarily directed to an embodiment wherein the parameter for which values are calculated in step 106 comprises a time-to-collision (TTC) between the host and a target vehicle. However, while the description below may be limited to the use of TTCs, it will be appreciated that in other exemplary embodiments values for parameters other than TTC may be calculated and used in the steps of method 100 described below, and therefore, the present disclosure is not meant to be limited solely to an embodiment of method 100 that utilizes TTC.

As the name may suggest, the TTC for a target vehicle represents the amount of time until the host vehicle will collide with that particular target vehicle under the conditions or circumstances existing when the TTC was calculated. In other words, barring a change in one or more conditions or circumstances existing when the TTC was calculated, the host vehicle will collide with the corresponding target vehicle in an amount of time that is equal to the TTC. Accordingly, the lower the TTC, the greater the collision threat, and therefore, the greater the likelihood that there will be a collision between the host vehicle and that target vehicle corresponding to the TTC. The TTC for a target vehicle may be calculated in a number of ways, such as, for example, by solving for "time" using Newton's equations of motion wherein the inputs to the equation comprise the known relative position, velocity, and acceleration between the host vehicle and the corresponding target vehicle. In an exemplary embodiment, the TTC for a given target vehicle may be calculated using equation (1):

$$TTC = \frac{-\Delta v - \sqrt{(\Delta v)(\Delta v) - 2(\Delta a)(\Delta d)}}{\Delta a}; \quad (1)$$

where $\Delta v$ is the relative velocity between the host and corresponding target vehicle, $\Delta d$ is the distance between the host and corresponding target vehicle, and $\Delta a$ is the relative acceleration between the host and corresponding target vehicle. For purposes of illustration, and to demonstrate an exemplary TTC calculation for a hypothetical target vehicle, assume that the respective terms of equation (1) have the following values: $\Delta v = -5.9$ m/s, $\Delta a = -0.1$ m/s$^2$; and $\Delta d = 60.5$ m. In such a scenario, when these values are input into equation (1), the solving of equation (1) produces a TTC value of 9.49 seconds. Accordingly, in this example, unless there is a change in circumstances relating to one or both of the host and target vehicles, the host vehicle is expected to collide with the target vehicle in approximately 9.49 seconds.

As described above, values for some or all the terms of equation (1) may be provided by target sensor 30. Alternatively, these values may be derived from readings from target sensor 30. For example, in an exemplary embodiment, control module 40 may receive velocity readings corresponding to the target vehicle from target sensor 30 and use those readings to calculate the acceleration (or deceleration, as the case may be) of the target vehicle (e.g., a current velocity reading and a previously received velocity reading may be used along with the amount of time that has elapsed between the two readings (e.g., 40 ms) to calculate the acceleration of the target vehicle). The calculated acceleration may then be used to compute the relative acceleration between the host and target vehicle. Accordingly, it will be appreciated that the values of the terms used in equation (1) to calculate the TTC for a target vehicle may be acquired in a number of ways, each of which remains within the spirit and scope of the present disclosure.

As with steps 102 and 104 described above, in an exemplary embodiment, control module 40 is configured to perform step 106. However, in other exemplary embodiments that remain within the spirit and scope of the present disclosure, a component that is part of, or configured for communication with, system 10 other than control module 40 may be configured to perform step 106, or various portions thereof. For example, in an exemplary embodiment, a suitable component of system 10 other than control module 40 may be configured to calculate the parameter values for each target vehicle, and to then provide those values to control module 40 for use in later steps of method 100. Accordingly, control module 40 may be configured to acquire the calculated parameter values either by performing the calculations itself or by obtaining the calculated values from some other component that is part of, or configured for communication with, system 10, and both embodiments remain within the spirit and scope of the present disclosure. Thus, it will be appreciated that the present disclosure is not meant to be limited to the performance of step 106 by any one or more particular components.

Following the calculation of a TTC for each of a plurality of target vehicles 14, method 100 comprises a step 108 of selecting for evaluation and evaluating one or more of the calculated TTCs to determine if the host vehicle is likely to collide with one or more target vehicles (i.e., a collision between the host vehicle and one or more target vehicles is imminent); and if it is determined, based on that evaluation, that a collision is likely or is imminent, method 100 further includes a step 110 of triggering one or more collision avoidance measures.

With respect to step 108, the evaluation performed in this step may employ any number of evaluation schemes to evaluate one or more TTCs. For example, because the TTC and the likelihood of collision corresponding thereto are inversely proportional, the lowest TTC value represents the highest likelihood of collision of all of the calculated TTCs. Accordingly, in an exemplary embodiment, only the lowest of the calculated TTCs may be selected for evaluation since it poses the greatest collision threat or risk to the host vehicle. In such an embodiment, if the lowest TTC is shared by two or more different vehicles, the TTC corresponding to the closest target vehicle 14 to the host vehicle 12 may be selected for evaluation. In other exemplary embodiments, rather than selecting one TTC for evaluation, two or more TTCs may be selected and evaluated. For example, in various embodiments, each of the calculated TTCs may be individually evaluated, or all of those TTCs that meet certain criteria (e.g., are below a certain value or that share the lowest TTC value) may be evaluated. Accordingly, the present disclosure is not meant to be limited to any one particular evaluation scheme, but rather any number of evaluation schemes, including but not limited to those described herein, may be employed, each of which remains within the spirit and scope of the present disclosure. Further, in an exemplary embodiment, the calculated TTC selected and ultimately evaluated in step 108 corresponds to a target vehicle that is different than the target vehicle to which a calculated TTC that was previously selected and evaluated in an earlier iteration of method 100 corresponds.

Whether one or more TTCs are selected to be evaluated in step 108, the actual evaluation performed in step 108 may take any number of forms. For instance, in an exemplary embodiment, control module 40 is configured to compare each TTC that is to be evaluated to at least one, and in certain embodiments, multiple, TTC threshold(s).

In an embodiment wherein a calculated TTC is compared with a single TTC threshold, the TTC threshold may, in general terms, correspond to the shortest amount of time within which a driver of the host vehicle may be able to take evasive action (e.g., stop the host vehicle, perform evasive steering maneuvers, etc.) to avoid colliding with the target vehicle corresponding to the particular TTC being evaluated. The TTC threshold may be a constant, static threshold that may be empirically-derived during a manufacturing process of system 10 and programmed into or accessible by, for example, control module 40. Alternatively, and as will be described below, the TTC threshold may be a dynamic threshold that is recalculated or updated for each iteration of method 100 to account for changing conditions and circumstances relating to, for example, the host and target vehicle (s). Accordingly, in such an embodiment, the threshold value(s) used in step 108 must first be calculated prior to evaluating one or more particular TTCs. Additionally, and for reasons that will be apparent in view of the description below, different dynamic thresholds may be used to evaluate the TTCs of different target vehicles such that no one threshold is used to evaluate more than one target vehicle.

In an exemplary embodiment in which a dynamic TTC threshold is utilized, one or more TTC thresholds may be calculated that take into account different considerations, including, without limitation, those described below. For example, one threshold to which the TTC of a particular target vehicle may be compared corresponds to the amount of it time it would take the driver of the host vehicle, under the particular conditions/circumstances existing at the time the threshold value is calculated, to apply the brakes and either stop the host vehicle or sufficiently slow it down so as to avoid a collision with that particular target vehicle. This threshold may be calculated using techniques that are well known in the art and that take into account, for example, the known position of the target vehicle relative to the host vehicle (e.g., distance from the host vehicle) and the relative velocity between the host vehicle and target vehicle, both of which, as described above with respect to step 102, may be received from target sensor 30 or derived from readings thereof, and the known maximum braking capability of the host vehicle (i.e., maximum deceleration), which may be stored in and acquired from a memory or other storage device of system 10, such as, for example, memory 42 of control module 40. It will be appreciated in view of the description above that because the threshold calculation takes into account certain attributes relating to the target vehicle (e.g., known position of target vehicle relative to the host vehicle, relative velocity between the host and target vehicles, etc.), the calculated threshold is specific to a particular target vehicle. As such, in an instance wherein multiple TTCs corresponding to multiple target vehicles are to be evaluated in step 108, a different threshold value must be calculated for each target vehicle so as to provide a meaningful evaluation.

Another TTC threshold that may be utilized is one corresponding to the amount of it time it would take the driver of the host vehicle, under the particular conditions/circumstances existing at the time the threshold value is calculated, to evasively steer (i.e., swerve) around the target vehicle so as to avoid a collision with that particular target vehicle. This threshold may also be calculated using techniques that are well known in the art and that take into account, for example, the known position of the target vehicle relative to the host vehicle (e.g., distance from the host vehicle) and the relative velocity between the host vehicle and target vehicle, both of which, as described above, may be received from target sensor 30 or derived from readings thereof, and the known turning radius of the host vehicle, which as with the maximum braking capability described above, may be stored in and acquired from a memory or other storage device of system 10, such as, for example, memory 42 of control module 40. Again, it will be appreciated that this calculated threshold is specific to a particular target vehicle. As such, in an instance wherein multiple TTCs corresponding to multiple target vehicles are to be evaluated in step 108, a different threshold value must be calculated for each target vehicle so as to provide a meaningful evaluation.

While TTC thresholds calculated by taking into account certain conditions have been specifically described above, the present disclosure is not meant to be limited to the use of such thresholds. Rather, those of ordinary skill in the art will appreciate that TTC thresholds that take into account any number of conditions in addition to or instead of those described specifically above may be used, and therefore, remain within the spirit and scope of the present disclosure.

Further, in an exemplary embodiment, rather than acquiring or calculating a single TTC threshold for use in evaluating the TTC of a particular target vehicle, method 108 may comprise calculating multiple thresholds and then selecting the smallest or lowest of the thresholds for evaluating a corresponding TTC value. For example, in an exemplary embodiment, values for each of the two TTC thresholds described above are calculated. Those calculated values are then compared and the smallest or lowest of the two is selected for use in evaluating the TTC value for a corresponding target vehicle.

In any event, in an embodiment wherein TTC threshold value(s) is/are used to evaluate the TTCs of one or more target vehicles, step 108 comprises a substep of acquiring (e.g., calculating or obtaining from a memory device, for example) an appropriate TTC threshold value for each of the one or more target vehicles corresponding to the TTCs that are to be evaluated. Accordingly, if the TTC of one target vehicle is to be evaluated, a TTC threshold corresponding to that particular target vehicle is acquired. If, on the other hand, the TTCs of two or more target vehicles are to be evaluated, a TTC threshold is acquired for each target vehicle. Once the appropriate threshold(s) is/are acquired, step 108 comprises a further substep of comparing each TTC that is to be evaluated with the appropriate threshold to determine if the host vehicle is likely to collide with one or more target vehicles corresponding to the evaluated TTC(s).

In an exemplary embodiment, if each evaluated TTC value exceeds the TTC corresponding thereto (i.e., each evaluated TTC value represents a greater amount of time than the corresponding TTC threshold) or, in certain embodiments, meets or exceeds the TTC threshold corresponding thereto, it is assumed that the driver is able to avoid a collision with that or those particular target vehicle(s), and therefore, the host vehicle is not likely to collide with any target vehicles. As such, no intervention on the part of the active safety system 10 is necessary, and in such an instance, method 100 may return to step 102 and another iteration of method 100 may be performed (i.e., in an exemplary embodiment, method 100 is periodically repeated (e.g., every 40 ms or so) to provide continuous and substantially real-time collision avoidance functionality. If, on the other hand, any one of the evaluated TTC values falls below the TTC threshold to which it was compared (i.e., one or more of the evaluated TTC values represent a lesser amount of time than the TTC threshold to which it was compared) or, in certain embodiments, meets or falls below the TTC threshold to which it was compared, a determination can be made that the host vehicle is likely to collide with that or those particular target vehicle(s), and method 100 proceeds to step 110.

As briefly described above, step 110 comprises triggering or effectuating one or more collision avoidance measures when it is determined in step 108 that the host vehicle is likely to collide with one or more target vehicles. Any one or a combination of collision avoidance measures, at least some of which are well known in the art, may be triggered in step 110, including, for example and without limitation, one or a combination of those described below.

One exemplary collision avoidance measure comprises providing one or more alerts warning of the imminent or impending collision to the occupant(s) (e.g., driver) of the host vehicle. Such alerts may take any number of forms and may be conveyed in any number of ways, each of which is well known in the art. One type alert is an audible alert that may be broadcast over the vehicle radio or otherwise output by one or more speakers located within the cabin of the vehicle. The audible alerts may comprise warning messages or other indicators such as, for example, chimes, muting of the radio, etc. Another type of alert is a visual alert that may comprise, for example, flashing lights, textual messages, or other warning indicators displayed on a suitable display device, projected onto a portion of the windshield, etc. Yet another type of alert comprises tactile or haptic alerts that may include, for example, the tightening of a seat belt, the vibration of a seat or steering wheel, etc. Accordingly, if it is determined that a collision is likely, control module 40 may be configured to trigger the provision of one or more alerts to the occupants) of the host vehicle. More particularly, in an exemplary embodiment, control module 40 may be configured to directly control one or more devices (e.g., audio and/or visual display devices) to cause the alert(s) to be provided; while in another embodiment, control module 40 may be configured to generate and send electrical signals to another component of system 10 that is configured to cause the alert(s) to be provided. In either instance, it will be appreciated that each one of the aforementioned alerts may be provided individually, or alternatively, a combination of two or more of the alerts may be provided in concert. It will be further appreciated that while only certain alerts have been specifically identified above, the present disclosure is not intended to be limited to those particular alerts. Rather, any number of alerts in addition to those described above may be provided to the occupant(s) of the host vehicle in the event it is determined that there is likely to be a collision between the host vehicle and one or more target vehicles, and the provision of such alerts remains within the spirit and scope of the present disclosure.

Another type of collision avoidance measure that may be triggered in step 110 relates at least generally to the brake system of the host vehicle and may include, for example and without limitation, those collision avoidance techniques described in U.S. patent application Ser. No. 13/281,667 filed on Oct. 26, 2011, the entire disclosure of which is hereby incorporated by reference. More particularly, one brake-related avoidance measure comprises the pre-filling of the hydraulic brake system of the host vehicle in order to provide faster braking response should the driver of the host vehicle engage or apply the brakes of the vehicle. Another braking-related collision avoidance measure comprises a "brake assist" measure wherein brake pressure is autonomously added to the brake pressure being applied by the driver of the host vehicle when the driver-applied pressure is deemed to be insufficient. Yet another known collision avoidance measure relating to the brake system comprises the autonomous braking of the host vehicle in accordance with either a constant, predetermine brake setting or a dynamic autonomous braking scheme, regardless of whether the driver is applying the brakes. Accordingly, if it is determined that a collision is likely, control module 40 may be configured to generate and send one or more command signals to the brake system to cause one or more of the above described measures to be carried out.

While only certain collision avoidance measures have been described with particularity above, it will be appreciated that any number of other collision avoidance measures may be utilized in conjunction with or in place of those described above. Additional collision avoidance measures may include, for example, those relating to the steering of the host vehicle (i.e., autonomous steering) or the suspension of the host vehicle, airbag deployment, and the like. Accordingly, the present disclosure is not meant to be limited to the use of any one or more particular collision avoidance measures.

Accordingly, when it is determined in step 108 that a collision between the host vehicle and one or more target vehicles is likely, any one or a combination of collision avoidance measures, including, for example and without limitation, one or more of those measures described above, may be triggered and performed so as to prevent, avoid, and/or mitigate such a collision. Following the triggering or performance of the appropriate collision avoidance measure (s), and as illustrated in FIG. 2, method 100 may return to step 102 and another iteration of method 100 may be performed.

While the description above has been with respect to evaluating each of one or more TTCs of one or more target vehicles by comparing each TTC to a corresponding TTC threshold (step 108), and then triggering one or more collision avoidance measures when it is determined, based on that/those comparison(s), that a collision between the host vehicle and one or more target vehicles is likely (step 110), the present disclosure is not meant to be so limited. Rather, in other exemplary embodiments, the TTC of a target vehicle may be compared to multiple TTC thresholds, each corresponding to a different collision threat or likelihood of collision.

More particularly, for each TTC that is to be evaluated, step 108 may comprise comparing the TTC to a plurality of TTC thresholds, each of which corresponds to a different collision threat or likelihood of collision posed by the particular target vehicle to which the TTC corresponds. In such an embodiment, each TTC threshold may also correspond to, or be associated with, a different collision avoidance measure such that as the likelihood of collision or collision threat increases, so does to the severity of the collision avoidance measure that is triggered.

For example, a first TTC threshold may be calculated or otherwise acquired that corresponds to a low likelihood of collision (i.e., there is still time for the driver to take evasive action). As such, this threshold may have a collision avoidance measure associated therewith that comprises the provision of an alert to the occupant(s) of the host vehicle, such as, for example, those alerts described above. A second TTC threshold may also be calculated or otherwise acquired that corresponds to a likelihood of collision that is greater than that associated with the first TTC threshold, and as such, has a collision avoidance measures that is more severe or proactive than that associated with the first threshold. For example, a brake-related collision avoidance measure, such as, for example, one or more of those described above, may be associated with the second TTC threshold. It will be appreciated that while in the example above, only two TTC thresholds are described, in practice, any number of TTC thresholds associated with or corresponding to any number of different collision avoidance measures may be used. For example, in an embodiment wherein each of the collision avoidance measures described above are employed, four or more different TTC thresholds may be used: a first threshold corresponding to the provision of one or more alerts; a second threshold corresponding to the pre-filling of the hydraulic brake system; a third threshold corresponding to the "brake-assist"; and a fourth threshold corresponding the autonomous braking of the host vehicle without any driver involvement.

In addition to, or instead of, utilizing different TTC thresholds for different collision avoidance measures, in an exemplary embodiment, a number of different thresholds may be used to dynamically control one or more of the collision avoidance measures. For instance, in an embodiment wherein one collision avoidance measure comprises the autonomous braking of the host vehicle, multiple thresholds corresponding to the application of different magnitudes of brake pressure (which, in an exemplary embodiment, correspond to different vehicle deceleration rates) may be employed. Accordingly, in such an embodiment, a first threshold may correspond to a first brake pressure magnitude, a second threshold representing a more immediate collision threat or a greater likelihood of collision than that represented by the first threshold may correspond to a second brake pressure magnitude that is greater than the first brake pressure magnitude, and so on and so forth.

In an embodiment wherein step 108 may comprise comparing the TTC of a target vehicle to multiple TTC thresholds, such comparisons may be performed in a number of ways. For instance, in one embodiment, control module 40 is configured to simultaneously compare the TTC to two or more TTC thresholds, and then in step 110, to trigger one or more of the collision avoidance measures associated with that or those thresholds that the TTC falls below (or, in certain embodiments, meets or falls below). For example, if it is determined in step 108 that the TTC falls below two or more thresholds, step 110 may comprise triggering the collision avoidance measures associated with each of the two or more thresholds, or alternatively, triggering only the collision avoidance measures associated with one of the thresholds (e.g., the collision avoidance measure(s) associated with the threshold corresponding to the highest collision threat or likelihood of collision (e.g., application of the brakes of the host vehicle as opposed to providing one or more alerts)).

In another exemplary embodiment, rather than comparing the TTC to the thresholds simultaneously in step 108, the control module 40 may be configured to compare the TTC to one or more thresholds in accordance with a particular sequence, and if the TTC falls below one or more of the evaluated thresholds, to trigger one or more collision avoidance measures corresponding thereto in step 110.

Figure 3:
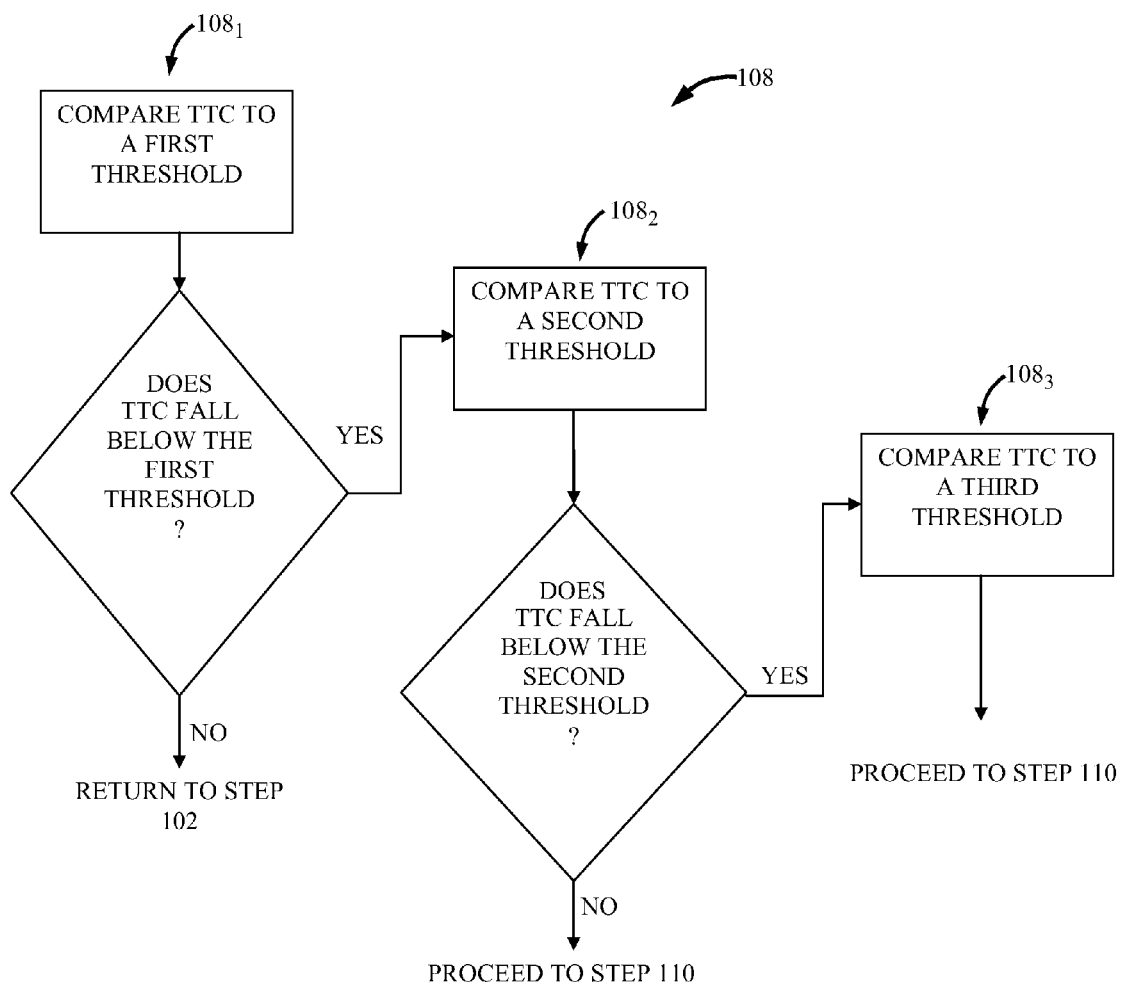
FIG. 3 is a flowchart illustrating exemplary embodiments of an evaluation step of the method illustrated in FIG. 2.

For example, in an embodiment such as that illustrated in FIG. 3 wherein a TTC may be compared to three (3) different thresholds, the TTC is first compared to the threshold corresponding to the lowest collision threat or likelihood of collision (i.e., the largest TTC threshold value) (Step $108_1$). If the TTC exceeds (or, in certain embodiments, meets or exceeds) that threshold value, it can be determined that there is no likelihood of collision, and method 100 may return to step 102. If, however, the TTC falls below (or, in certain embodiments, meets or falls below) the first threshold value, the TTC is then compared to a second threshold corresponding to a collision threat or likelihood of collision that is greater than that corresponding to the first threshold (Step $108_2$). If the TTC exceeds (or, in certain embodiments, meets or exceeds) the second threshold value, only the collision avoidance measure(s) corresponding to the first threshold may be triggered in step 110, and then method 102 may return to step 102 where method 100 may be repeated. On the other hand, if the TTC falls below (or, in certain embodiments, meets or falls below) the second threshold value, the TTC is then compared to a third threshold corresponding to collision threat or likelihood of collision that is greater than that corresponding to both the first and second thresholds (Step $108_3$). If the TTC exceeds (or, in certain embodiments, meets or exceeds) the third threshold value, only the collision avoidance measure(s) corresponding to one or both of the first and second thresholds may be triggered in step 110, and then method 100 may return to step 102 to be repeated. On the other hand, if the TTC falls below (or, in certain embodiments, meets or falls below) the third threshold value, the collision avoidance measure(s) corresponding to the third threshold, and in various embodiments, those corresponding to one or both of the first and second thresholds, may be triggered in step 110, and then method 100 may return to step 102 where method 102 may be repeated. In another exemplary embodiment, rather than triggering all of the relevant collision avoidance measures simultaneously as is done in the example above, as it is determined that the TTC falls below a given threshold, the collision avoidance measure(s) associated therewith may be triggered contemporaneous with the evaluation of the next threshold value in the sequence. Accordingly, in the example above, if it is determined that the TTC falls below the first threshold, the collision avoidance measure(s) associated therewith may be triggered contemporaneous with the comparison of the TTC to the second threshold, and so on and so forth.

Figure 4:
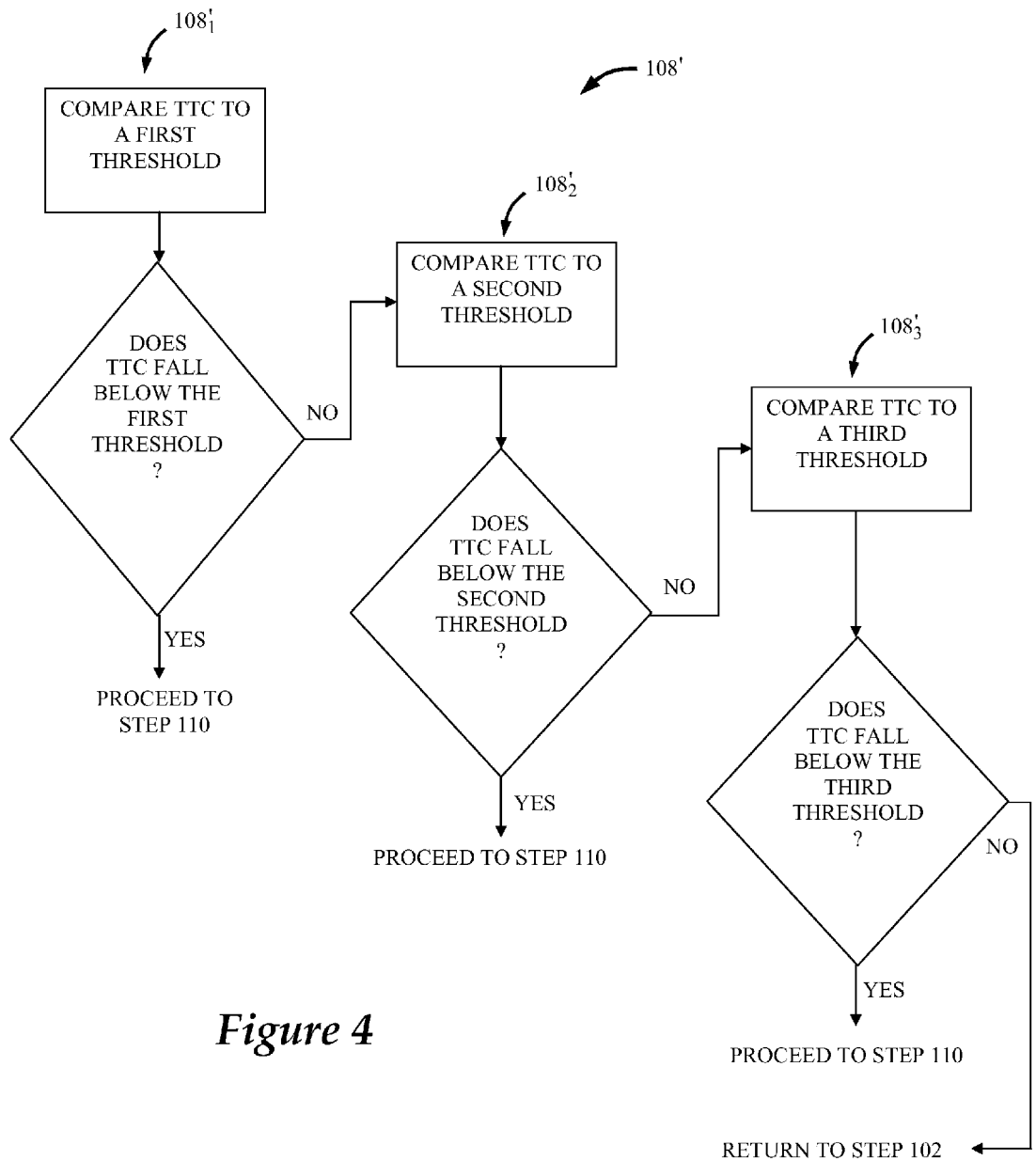
FIG. 4 is a flowchart illustrating another exemplary embodiment of the evaluation step of the method illustrated in FIG. 2.

While the embodiment described above is with respect to a particular number of thresholds and a particular sequence in accordance with which those thresholds are evaluated, it will be appreciated by those having ordinary skill in the art that the present disclosure is not meant to be limited to such an embodiment. Rather, step 108 may utilize any number of thresholds (more or less than three (3)) and/or evaluation sequences. For example, rather than starting with the threshold corresponding to the lowest likelihood of collision and then, as each threshold is met, moving to another threshold corresponding to a higher likelihood of collision, a reverse sequence may be employed. Accordingly, in an exemplary embodiment such as that illustrated in FIG. 4 wherein a TTC may be compared to three (3) different thresholds, the TTC is first compared to the threshold corresponding to the highest collision threat or likelihood of collision (i.e., the smallest TTC threshold value) (Step $108_1'$). If the TTC falls below (or, in certain embodiments, meets or falls below) that threshold value, the collision avoidance measure(s) corresponding thereto may be triggered in step 110. If, on the other hand, the TTC exceeds (or, in certain embodiments, meets or exceeds) that threshold, the TTC is then compared to a second threshold corresponding to collision threat or likelihood of collision that is lower than that corresponding to the first threshold (Step $108_2'$). If the TTC falls below (or, in certain embodiments, meets or falls below) the second threshold value, the collision avoidance measure(s) corresponding thereto may be triggered in step 110. If, on the other hand, the TTC exceeds (or, in certain embodiments, meets or exceeds) that threshold, the TTC is then compared to a third threshold corresponding to collision threat or likelihood of collision that is lower than that corresponding to both the first and second thresholds (Step $108_3'$). If the TTC falls below (or, in certain embodiments, meets or falls below) the third threshold value, the collision avoidance measure(s) corresponding thereto may be triggered in step 110. If, on the other hand, the TTC exceeds (or, in certain embodiments, meets or exceeds) that threshold, it can be determined that there is no likelihood of collision, and method 100 may return to step 102.

Accordingly, in view of the foregoing, it will be appreciated that any number of thresholds, and in an embodiment wherein multiple thresholds may be utilized, any number of threshold evaluation sequences, may be used to perform step 108; and any number of collision avoidance measures or combinations thereof may be triggered in 110. Accordingly, the present disclosure is not meant to be limited to any one or more particular embodiments of either step 108 or step 110.

As may be evident in view of the description above, in an exemplary embodiment, control module 40 is configured to perform steps 108 and 110. However, in other exemplary embodiments that remain within the spirit and scope of the present disclosure, a suitable component that is part of, or configured for communication with, system 10 other than control module 40 may perform one or both of steps 108 and 110, or certain portions thereof. Accordingly, it will be appreciated that the present disclosure is not meant to be limited to the performance of step 108 by any one or more particular components.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use in an active safety system installed on a host vehicle, comprising the steps of:
   for each of a plurality of consecutively-arranged target objects in a common path in front of the host vehicle, calculating a time to collision (TTC) between the target object and the host vehicle by emitting and receiving signals underneath one or more of the consecutively-arranged target objects;
   for each of the plurality of consecutively-arranged target objects in a common path in front of the host vehicle, evaluating the calculated TTC to first determine which of the plurality of consecutively-arranged target objects has the lowest TTC and then to determine if the host vehicle is likely to collide with the target object corresponding to the lowest TTC; and
   when it is determined that the host vehicle is likely to collide with the target object corresponding to the lowest TTC and that target object is not the closest of the plurality of consecutively-arranged target objects in the common path in front of the host vehicle, triggering one or more collision avoidance measures that are designed to address the target object corresponding to the lowest TTC as opposed to the target object that is the closest of the consecutively-arranged target objects.

2. The method of claim 1, wherein:
   the evaluating step comprises comparing one of the one or more calculated TTCs to a TTC threshold; and
   the triggering step comprises triggering one or more collision avoidance measures when the calculated TTC falls below the TTC threshold.

3. The method of claim 1, wherein:
   the evaluating step comprises comparing each of the one or more calculated TTCs to a respective TTC threshold; and the triggering step comprises triggering one or more collision avoidance measures when at least one of the one or more calculated TTCs falls below the TTC threshold to which it was compared.

4. The method claim 1, wherein:
the evaluating step comprises comparing one of the calculated TTCs to a plurality of TTC thresholds; and
the triggering step comprises triggering one or more collision avoidance measures when the calculated TTC falls below at least one of the plurality of thresholds.

5. The method of claim 1, wherein the one or more collision avoidance measures comprises providing one or more visual, audible, or haptic alerts to the occupant(s) of the host vehicle.

6. The method of claim 1, wherein the one or more collision avoidance measures comprises one or more of autonomously applying the brakes of the host vehicle and pre-filling the hydraulic brake system of the host vehicle.

7. The method of claim 1, wherein the one or more calculated TTCs evaluated in the evaluating step each correspond to a target object that is different than that corresponding to a previously evaluated calculated TTC.

8. The method of claim 1, wherein:
a first target vehicle is located in front of the host vehicle, a second target vehicle is located in front of the first target vehicle, and both the first and second target vehicles are located in the common path in front of the host vehicle, and wherein the triggering step comprises triggering one or more collision avoidance measures in response to the second target vehicle.

* * * * *